(12) United States Patent
Nara et al.

(10) Patent No.: US 8,863,012 B2
(45) Date of Patent: Oct. 14, 2014

(54) MAP-LINKED FERTILIZATION DESIGN SYSTEM

(75) Inventors: Tomoyuki Nara, Tokyo (JP); Noriko Yamagata, Tokyo (JP)

(73) Assignee: Hitachi Solutions, Ltd., Tokyo (JP)

(*) Notice: Subject to any disclaimer, the term of this patent is extended or adjusted under 35 U.S.C. 154(b) by 910 days.

(21) Appl. No.: 13/030,446

(22) Filed: Feb. 18, 2011

(65) Prior Publication Data

US 2011/0246915 A1 Oct. 6, 2011

(30) Foreign Application Priority Data

Mar. 31, 2010 (JP) ................................ 2010-080566

(51) Int. Cl.
- *G06F 3/048* (2013.01)
- *G01V 3/38* (2006.01)
- *A01C 21/00* (2006.01)

(52) U.S. Cl.
CPC .................................. *A01C 21/007* (2013.01)
USPC ............................................. 715/764; 702/5

(58) Field of Classification Search
USPC .......... 715/764; 702/5; 71/64.01; 47/58.1 SC
See application file for complete search history.

(56) References Cited

U.S. PATENT DOCUMENTS

| | | | | |
|---|---|---|---|---|
| 5,220,876 A | * | 6/1993 | Monson et al. | 111/130 |
| 6,139,597 A | * | 10/2000 | Tijsma et al. | 71/64.11 |
| 7,188,450 B2 | * | 3/2007 | Raun et al. | 47/58.1 SC |
| 2005/0038568 A1 | * | 2/2005 | Hood et al. | 700/283 |
| 2007/0186830 A1 | * | 8/2007 | Fraisse et al. | 111/200 |
| 2007/0288167 A1 | | 12/2007 | Anderson et al. | |
| 2009/0164281 A1 | * | 6/2009 | Norgaard et al. | 705/7 |
| 2012/0101784 A1 | * | 4/2012 | Lindores et al. | 703/2 |
| 2012/0234934 A1 | * | 9/2012 | Score et al. | 239/7 |

FOREIGN PATENT DOCUMENTS

| | | |
|---|---|---|
| CN | 1099550 A | 3/1995 |
| CN | 101452505 A | 6/2009 |
| JP | 04-280385 A | 10/1992 |
| JP | 2001-220278 A1 | 8/2001 |
| JP | 2009-259101 A1 | 5/2009 |

* cited by examiner

*Primary Examiner* — Rashawn Tillery
(74) *Attorney, Agent, or Firm* — Mattingly & Malur, PC

(57) ABSTRACT

The present invention aims to provide a system that automatically shows multiple fertilization design patterns suitable for the soil and crop, in linkage with map data and in accordance with fertilization design conditions each including a different fertilizer pattern and priority condition so as to allow the user to compare the multiple fertilization patterns on the same screen. The system includes units configured to receive designation of an agricultural field on the map, then to receive a fertilization design condition including a fertilizer pattern and a priority condition, to design fertilization patterns for the agricultural field, and to display the designed fertilization patterns on the same screen.

1 Claim, 15 Drawing Sheets

Fig. 2

| | 201 | 202 | 203 | 204 | 205 | | 206 |
|---|---|---|---|---|---|---|---|
| | Year | Producer number | Agricultural field number | Crop number | Planting area | ... | Shape information |
| | 2010 | 00000001 | 1 | 0400 | 800 | ... | ... |
| | 2010 | 00000001 | 2 | 0750 | 700 | ... | ... |
| | 2010 | 00000001 | 3 | 0110 | 700 | ... | ... |
| | 2010 | 00000002 | 1 | 0400 | 400 | ... | ... |
| | 2010 | 00000002 | 2 | 0610 | 300 | ... | ... |
| | : | : | : | : | : | : | : |

Fig. 3

| Year 301 | Producer number 302 | Agricultural field number 303 | Soil code 304 | Nitrogen 305 | Phosphoric acid 306 | Potash 307 | Magnesium 308 | ... |
|---|---|---|---|---|---|---|---|---|
| 2010 | 00000001 | 1 | 10 | 5.8 | 20.5 | 18.9 | 45 | ... |
| 2010 | 00000001 | 2 | 10 | 6.0 | 21.0 | 19.0 | 50 | ... |
| 2010 | 00000001 | 3 | 10 | 5.5 | 20.0 | 18.5 | 40 | ... |
| 2010 | 00000002 | 1 | 60 | 6.0 | 20.0 | 20.0 | 35 | ... |
| 2010 | 00000002 | 2 | 60 | 5.8 | 19.5 | 25.0 | 38 | ... |
| ... | ... | ... | ... | ... | ... | ... | ... | ... |

Fig. 4

| Crop number | Crop name |
|---|---|
| 0110 | Sweet corn |
| 0400 | Wheat |
| 0610 | Potato |
| 0750 | Beet |
| : | : |

401 — Crop number
402 — Crop name

Fig. 5

| Soil code | Soil name |
|---|---|
| 10 | Brown volcanic soil |
| 20 | Black volcanic soil |
| 60 | Alluvial soil |
| 70 | Peat soil |
| : | : |

501 — Soil code
502 — Soil name

Fig. 6

| Fertilizer code 601 | Fertilizer name 602 | Fertilizer classification 603 | Nitrogen content 604 | Phosphoric acid content 605 | Potash content 606 | Magnesium content 607 | Priority order 608 | ... | Price 609 |
|---|---|---|---|---|---|---|---|---|---|
| 1 | Compound fertilizer A | 7 | 10.0 | 20.0 | 10.0 | 5.0 | 1 | ... | 1100 |
| 2 | Compound fertilizer B | 7 | 15.0 | 15.0 | 16.0 | 4.0 | 2 | ... | 1000 |
| 3 | Compound fertilizer C | 7 | 12.0 | 18.0 | 15.0 | 3.0 | 3 | ... | 1200 |
| 4 | N single fertilizer A | 1 | 16.0 | 0.0 | 0.0 | 0.0 | 1 | ... | 800 |
| 5 | N single fertilizer B | 1 | 10.0 | 0.0 | 0.0 | 0.0 | 2 | ... | 900 |
| .. | .. | .. | .. | .. | .. | .. | .. | .. | .. |

Fig. 7

| Crop number 701 | Soil code 702 | Soil component 703 | Reference value lower limit 704 | Reference value upper limit 705 | Target amount when amount is not greater than reference value 706 | Target amount when amount is appropriate 707 | Target amount when amount is not less than reference value 708 |
|---|---|---|---|---|---|---|---|
| 0110 | 10 | Nitrogen | 5.0 | 14.0 | 6.6 | 6.0 | 5.4 |
| 0110 | 10 | Phosphoric acid | 15.0 | 30.0 | 26.0 | 20.0 | 14.0 |
| 0110 | 10 | Potash | 15.0 | 30.0 | 6.6 | 6.0 | 3.6 |
| 0110 | 10 | Magnesium | 35.0 | 45.0 | 3.3 | 3.0 | 0.9 |
| 0110 | 20 | Nitrogen | 5.0 | 14.0 | 6.6 | 6.0 | 5.4 |
| .. | .. | .. | .. | .. | .. | .. | .. |

Fig. 8

| Year | Producer number | Agricultural field number | Fertilization number | Crop number | ... |
|---|---|---|---|---|---|
| 2010 | 00000001 | 1 | 1 | 0400 | ... |
| 2010 | 00000001 | 2 | 1 | 0750 | ... |
| 2010 | 00000001 | 3 | 1 | 0110 | ... |
| 2010 | 00000002 | 1 | 1 | 0400 | ... |
| 2010 | 00000002 | 2 | 1 | 0610 | ... |
| : | : | : | : | : | : |

| Year 901 | Producer number 902 | Agricultural field number 903 | Fertilization number 904 | Design pattern 905 | Fertilizer condition 906 | Priority condition 907 | Nitrogen tolerance 908 | Phosphoric acid tolerance 909 | Potash tolerance 910 | Magnesium tolerance 911 |
|---|---|---|---|---|---|---|---|---|---|---|
| 2010 | 00000001 | 1 | 1 | 1 | 1 | 2 | 20 | 20 | 20 | 20 |
| 2010 | 00000001 | 1 | 1 | 2 | 2 | 2 | 20 | 20 | 20 | 20 |
| 2010 | 00000001 | 1 | 1 | 3 | 3 | 2 | 20 | 20 | 20 | 20 |
| .. | .. | .. | .. | .. | .. | .. | .. | .. | .. | .. |

Fig. 10

| 1001 | 1002 | 1003 | 1004 | 1005 | 1006 | 1007 |
|---|---|---|---|---|---|---|
| Year | Producer number | Agricultural field number | Fertilization number | Design pattern | Fertilizer code | Fertilization amount |
| 2010 | 00000001 | 1 | 1 | 1 | 1 | 75 |
| 2010 | 00000001 | 1 | 1 | 2 | 2 | 65 |
| 2010 | 00000001 | 1 | 1 | 2 | 7 | 10 |
| 2010 | 00000001 | 1 | 1 | 3 | 4 | 47 |
| 2010 | 00000001 | 1 | 1 | 3 | 8 | 36 |
| 2010 | 00000001 | 1 | 1 | 3 | 10 | 15 |
| : | : | : | : | : | : | : |

Selection of agricultural field for which fertilization design is performed

Fig. 14

1402 Next year planting crop input portion

1403 Appropriate fertilization target amount display portion

1401 Basic information display portion

1404 Fertilization design condition input portion

1405 Fertilization design result display portion

1406 Soil analysis value display portion

Fig. 15

■Design pattern 1
Fertilizer condition: compound fertilizer, priority condition: priority on fertilizer costs

| Fertilizer brand | Fertilization amount per 10a (kg/10a) | Fertilizer costs per 10a (yen/10a) | Fertilization component amount (kg/10a) | | | |
|---|---|---|---|---|---|---|
| | | | Nitrogen | Phosphoric acid | Potash | Magnesium |
| | | | Tolerance range ±20% | Tolerance range ±20% | Tolerance range ±20% | Tolerance range ±20% |
| Compound fertilizer A | 75 | 4,125 | 7.5 | 1.5 | 7.5 | 3.8 |
| | | | | | | |
| Total | 75 | 4,125 | 7.5 | 1.5 | 7.5 | 3.8 |
| Difference from target amount | | | -2.5 | 0 | -2.5 | -0.2 |

■Design pattern 2
Fertilizer condition: compound fertilizer + single fertilizer, priority condition: priority on fertilizer costs

| Fertilizer brand | Fertilization amount per 10a (kg/10a) | Fertilizer costs per 10a (yen/10a) | Fertilization component amount (kg/10a) | | | |
|---|---|---|---|---|---|---|
| | | | Nitrogen | Phosphoric acid | Potash | Magnesium |
| | | | Tolerance range ±20% | Tolerance range ±20% | Tolerance range ±20% | Tolerance range ±20% |
| Compound fertilizer B | 65 | 3,250 | 9.8 | 9.8 | 10.4 | 2.6 |
| P single fertilizer A | 10 | 662 | | 2 | | 1.2 |
| Total | 75 | 3,912 | 9.8 | 11.8 | 10.4 | 3.8 |
| Difference from target amount | | | -0.2 | -3.2 | 0.4 | -0.2 |

■Design pattern 3
Fertilizer condition: single fertilizer, priority condition: priority on fertilizer costs

| Fertilizer brand | Fertilization amount per 10a (kg/10a) | Fertilizer costs per 10a (yen/10a) | Fertilization component amount (kg/10a) | | | |
|---|---|---|---|---|---|---|
| | | | Nitrogen | Phosphoric acid | Potash | Magnesium |
| | | | Tolerance range ±20% | Tolerance range ±20% | Tolerance range ±20% | Tolerance range ±20% |
| N single fertilizer A | 47 | 1,880 | 7.5 | | | |
| P single fertilizer B | 36 | 2,160 | | 12.6 | | 2.5 |
| K single fertilizer A | 15 | 900 | | | 7.5 | |
| Total | 98 | 4,940 | 7.5 | 12.6 | 7.5 | 2.5 |
| Difference from target amount | | | -2.5 | -2.4 | -2.5 | -1.5 |

MAP-LINKED FERTILIZATION DESIGN SYSTEM

BACKGROUND OF THE INVENTION

1. Field of the Invention

The present invention relates to a map-linked fertilization design system that brings about an appropriate type of a fertilizer and an appropriate amount of the fertilizer in accordance with conditions of a soil, crop, and the like.

2. Description of the Related Art

Agricultural producers have to design fertilization appropriate to a crop to be planted next year, in accordance with conditions of a soil or the like.

Currently, agricultural producers calculate an appropriate fertilization component target amount of each component of a fertilizer, such as nitrogen, phosphoric acid, potash, or magnesium on the basis of soil analysis data or information on a crop planned to be planted or the like. Then, the agricultural producers determine an appropriate fertilizer type and an appropriate fertilization amount with which the fertilization component amount comes as close as the appropriate fertilization component target amount.

As known technical documents related to the present invention, Patent Documents 1 and 2 below can be cited. Both technical documents describe techniques for automatic selection of an optimum fertilizer for a certain condition.

Patent Document 1: Japanese Patent No. 4280385
Patent Document 2: Japanese Patent Application Publication No. 2009-259101

SUMMARY OF THE INVENTION

The techniques described in above Patent Documents 1 and 2 are ones each of which shows a single optimum fertilization design pattern and does not show multiple fertilization design patterns in linkage with map data and in accordance with different fertilization design conditions.

The present invention aims to provide a map-linked fertilization design system that automatically shows multiple fertilization design patterns suitable for the soil and crop in linkage with map data and in accordance with different fertilization design conditions. Each of the fertilization design conditions includes a fertilizer pattern of "compound fertilizer only," "compound fertilizer+single fertilizer", or "single fertilizer only," and a priority condition of "priority on tolerance," "priority on fertilizer costs," or "priority on application amount" or the like within a tolerance range of an appropriate fertilization component target amount of each component of a fertilizer. In addition, the map-linked fertilization design system thus allows a user to compare the multiple fertilization design patterns on the same screen and to determine an appropriate fertilizer type and an appropriate fertilization amount. The present invention thus aims to make contributions to the efficient fertilization design, reduction in fertilization costs, and environmental preservation through appropriate fertilization with the map-linked fertilization design system.

To achieve the above object, a map-linked fertilization design system according to the present invention, for designing a fertilization pattern for an agricultural field by use of a computer, includes:

a map data display means for displaying a map including an agricultural field;

a fertilization condition receiving means for receiving a fertilization design condition from an input screen after receiving designation of an agricultural field on the displayed map, the fertilization design condition including a priority condition and a combination pattern of fertilizers used for fertilization;

a fertilization design means for designing at least one fertilization pattern for the agricultural field with reference to a database storing therein soil information on the agricultural field and a database storing therein information on fertilizers, and also with reference to the fertilization design condition received by the fertilization condition receiving means; and a fertilization design result display means for displaying the at least one fertilization pattern and information on the agricultural field on the same screen, the fertilization pattern designed by the fertilization design means.

According to the present invention, fertilization design patterns suitable for the soil and crop can be automatically shown in linkage with map data and in accordance with fertilization design conditions each including a fertilizer pattern of "compound fertilizer only," "compound fertilizer+single fertilizer", or "single fertilizer only," and a priority condition of "priority on tolerance," "priority on fertilizer costs," or "priority on application amount" or the like within a tolerance range of an appropriate fertilization component target amount of each component of a fertilizer. In addition, an appropriate fertilizer type and an appropriate fertilization amount can be determined in comparison with the multiple fertilization design patterns on the same screen. Thus, it is possible to make contributions to the efficient fertilization design, reduction in fertilization costs, and environmental preservation through appropriate fertilization.

BRIEF DESCRIPTION OF THE DRAWINGS

FIG. 2 is a data configuration diagram of an agricultural field information DB.
FIG. 3 is a data configuration diagram of a soil information DB.
FIG. 4 is a data configuration diagram of a crop master DB.
FIG. 5 is a data configuration diagram of a soil type master DB.
FIG. 6 is a data configuration diagram of a fertilizer master DB.
FIG. 7 is a data configuration diagram of a soil analysis reference value master DB.
FIG. 8 is a data configuration diagram of a fertilization design information DB.
FIG. 9 is a data configuration diagram of a fertilization design condition information DB.
FIG. 10 is a data configuration diagram of a fertilization design fertilizer information DB.
FIG. 14 is a screen image of fertilization design.
FIG. 15 is a display image of fertilization design result.

DESCRIPTION OF THE PREFERRED EMBODIMENTS

Hereinafter, an embodiment of the present invention will be described.

Figure 1:
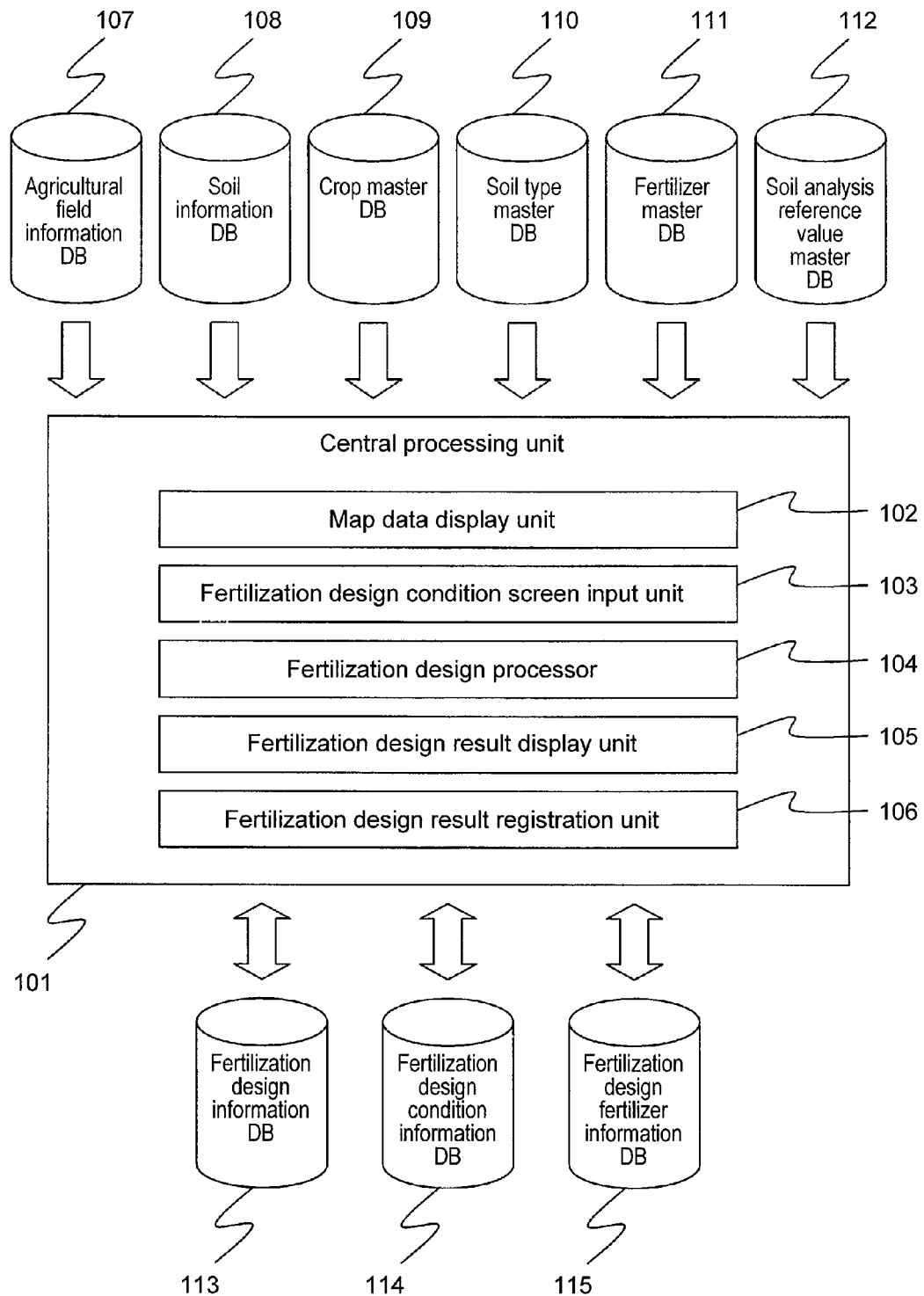
FIG. 1 is a system configuration diagram showing an embodiment of the present invention.

FIG. 1 is a system configuration diagram showing the embodiment of the present invention.

A user selects, from map data by a map data display unit 102 in a central processing unit 101, an agricultural field for which a fertilization design is to be made on the basis of map data. Then, the user inputs, from a fertilization design screen by use of a fertilization design condition screen input unit 103, three patterns of a fertilization design condition, each of the patterns including a fertilizer pattern of "compound fertilizer only," "compound fertilizer+single fertilizer," or "single fertilizer only," and a priority condition of "priority on tolerance," "priority on fertilizer costs," or "priority on application amount" or the like within a tolerance range of an appropriate fertilization component target amount of each component of a fertilizer. Then, a fertilization design processor 104 automatically calculates a fertilization design for an appropriate fertilizer type and an appropriate fertilization amount. Then, a fertilization design result display unit 105 displays three patterns of the fertilization design result on the fertilization design screen, the three patterns having different fertilization design conditions. Then, a fertilization design result registration unit 106 registers the fertilization design result in a fertilization design information DB 113, a fertilization design condition information DB 114 and a fertilization design fertilizer information DB 115. In addition, the central processing unit 101 accesses and refers to an agricultural field information DB 107, a soil information DB 108, a crop master DB 109, a soil type master DB 110, a fertilizer master DB 111 and a soil analysis reference value master DB 112 as appropriate.

FIG. 2 is a data configuration diagram of an agricultural field information DB 107. The agricultural field information DB 107 stores therein basic information on an agricultural field such as a planting year 201 for the agricultural field, a producer number 202 for identifying the producer, an agricultural field number 203 for identifying the agricultural field, a crop number 204 for identifying the crop type, a planting area 205, and shape information 206 on the agricultural field in the map data. The agricultural field information DB is linked with other databases related to the agricultural field, while the year 201, the producer number 202, and the agricultural field number 203 are used as the keys.

In addition, the shape information 206 stores therein, in a binary format, information such as coordinate values forming the shape of the agricultural field on the map data.

FIG. 3 is a data configuration diagram of a soil information DB 108.

The soil information DB 108 is linked with the agricultural field information DB shown in FIG. 2, while a year 301, a producer number 302, and an agricultural field number 303 are used as the keys. The soil information DB 108 stores therein soil information on each agricultural field, such as a soil code 304 for identifying the soil type of each agricultural field, a nitrogen component amount 305, a phosphoric acid component amount 306, a potash component amount 307, a magnesium component amount 308 and the like, the component amounts each being per 100 grams of the soil in the soil analysis data.

FIG. 4 is a data configuration diagram of a crop master DB 109. The crop master DB 109 stores therein information such as a crop number 401 and a crop name 402 for each crop.

FIG. 5 is a data configuration diagram of a soil type master DB 110. The soil type master DB 110 stores therein information such as a soil code 501 and a soil name 502 for each soil type.

FIG. 6 is a data configuration diagram of a fertilizer master DB 111. The fertilizer master DB 111 stores therein information on each fertilizer, such as a fertilizer code 601, a fertilizer name 602, a fertilizer classification 603, a nitrogen content 604, a phosphoric acid content 605, a potash content 606, a magnesium content 607, a priority order 608, and a price 609 per 20 kilograms. Here, the fertilizer classification 603 is one with which the fertilizer is classified into a single fertilizer, compound fertilizer, or the like.

FIG. 7 is a data configuration diagram of a soil analysis reference value master DB 112.

The soil analysis reference value master DB 112 is used for calculating an appropriate fertilization component target amount of each component of a fertilizer of a fertilization design in each agricultural field. Whether or not the amount of a soil component 703 such as nitrogen, phosphoric acid, potash, magnesium, or the like corresponding to a crop number 701 and a soil code 702 is within a reference range between a reference value lower limit 704 and a reference value upper limit 705 per 100 grams of the soil is determined. Among a target amount 706 used when the amount of the soil component is not greater than the reference value, a target amount 707 used when the amount of the soil component is appropriate, and a target amount 708 used when the amount of the soil component is not less than the reference value, the applicable target amount is determined as an appropriate fertilization component target amount per planting area 10 $a$.

FIG. 8 is a data configuration diagram of a fertilization design information DB 113.

The fertilization design information DB 113 is linked with the agricultural field information DB 107 shown in FIG. 2, while a year 801, a producer number 802, and an agricultural field number 803 are used as the keys. The fertilization design information DB 113 stores therein fertilization design basic information on each agricultural field, such as a fertilization number 804 for identifying the fertilization design of the agricultural field and a crop number 805 for identifying the crop type. In addition, the fertilization design information DB 113 is linked with a fertilization design condition information DB 114 shown in FIG. 9 and a fertilization design fertilizer information DB 115 shown in FIG. 10, while the year 801, the producer number 802, the agricultural field number 803, and the fertilization number 804 are used as the keys. Here, the fertilization design condition information DB 114 and the fertilization design fertilizer information DB 115 are related to fertilization designs of the agricultural fields.

FIG. 9 is a data configuration diagram of a fertilization design condition information DB 114.

The fertilization design condition information DB 114 is linked with the fertilization design information DB 113 shown in FIG. 8, while a year 901, a producer number 902, an agricultural field number 903, and a fertilization number 904 are used as the keys. In addition, the fertilization design condition information DB 114 stores therein fertilization design condition information for each design pattern 905 (design patterns 1 to 3), the fertilization design condition information including a fertilization condition 906 of "compound fertilizer," "compound fertilizer+single fertilizer," or "single fertilizer," a priority condition 907 of "priority on tolerance," "priority on fertilizer costs," or "priority on fertilization amount," a nitrogen tolerance 908 for the corresponding appropriate fertilization component target amount, a phosphoric acid tolerance 909 therefor, a potash tolerance 910 therefor, and a magnesium tolerance 911 therefor.

FIG. 10 is a data configuration diagram of a fertilization design fertilizer information DB 115.

The fertilization design fertilizer information DB 115 is linked with the fertilization design condition information DB 114 shown in FIG. 9, while a year 1001, a producer number 1002, an agricultural field number 1003, a fertilization number 1004, and a design patter 1005 are used as the keys. In addition, the fertilization design fertilizer information DB 115 stores therein fertilization design fertilizer information for each design pattern. Each design pattern includes a fertilizer code 1006 and a fertilization amount 1007 for each fertilizer automatically calculated on the basis of the fertilization design condition for each design pattern.

Figure 11:
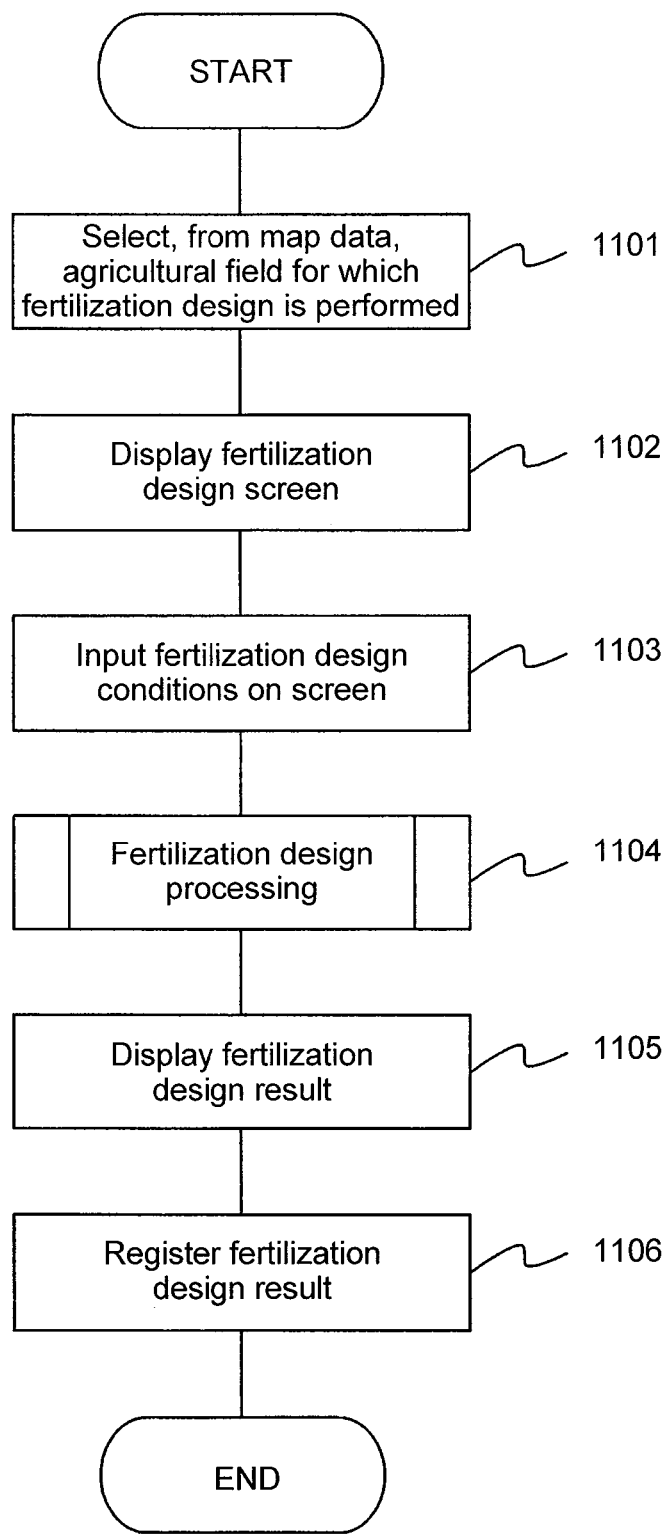
FIG. 11 is a flowchart of overall processing.

FIG. 11 is a flowchart of overall processing.

The following processing operations are sequentially executed: selection, from the map data, of an agricultural field for which a fertilization design is performed (step 1101); fertilization design screen display (step 1102); input of fertilization design conditions on screen (step 1103); fertilization design processing (step 1104); fertilization design result display (step 1105); and fertilization design result registration (step 1106).

Figure 13:
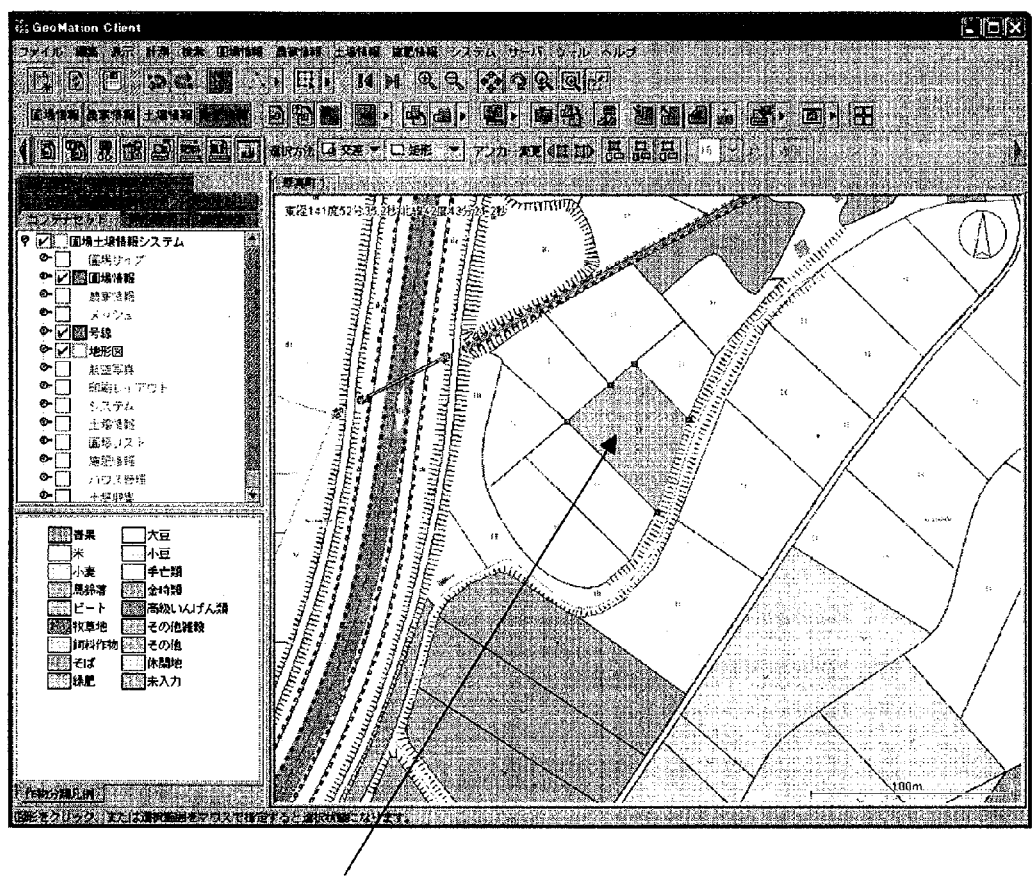
FIG. 13 is a screen image of map data display.

FIG. 13 is a screen image of map data display. In step 1101 shown in FIG. 11, an agricultural field for which a fertilization design is performed can be selected on map data display. In addition, it is also possible to refer to agricultural field information, soil information, fertilization design information, and the like of the selected agricultural field on the map data display.

FIG. 14 is a screen image of fertilization design. In step 1102 shown in FIG. 11, the fertilization design screen is displayed, and fertilization design basic information is displayed on a basic information display portion 1401 on the screen. In step 1103, when a crop to be planted next year is inputted to a next year planting crop input portion 1402 on the screen, an appropriate fertilization target amount and a soil analysis value corresponding to the crop to be planted next year are displayed on an appropriate fertilization target amount display portion 1403 and a soil analysis value display portion 1406, respectively. Then, three patterns of a fertilizer design condition are inputted to a fertilization design condition input portion 1404, each of the patterns including a fertilizer pattern of "compound fertilizer only," "compound fertilizer+single fertilizer," or "single fertilizer" and a priority condition of "priority on tolerance," "priority on fertilizer costs," or "priority on application amount" or the like within a tolerance range of an appropriate fertilization component target amount of each component of a fertilizer. In addition, a fertilization design result is displayed on a fertilization design result display portion 1405 in step 1105.

Figure 12:
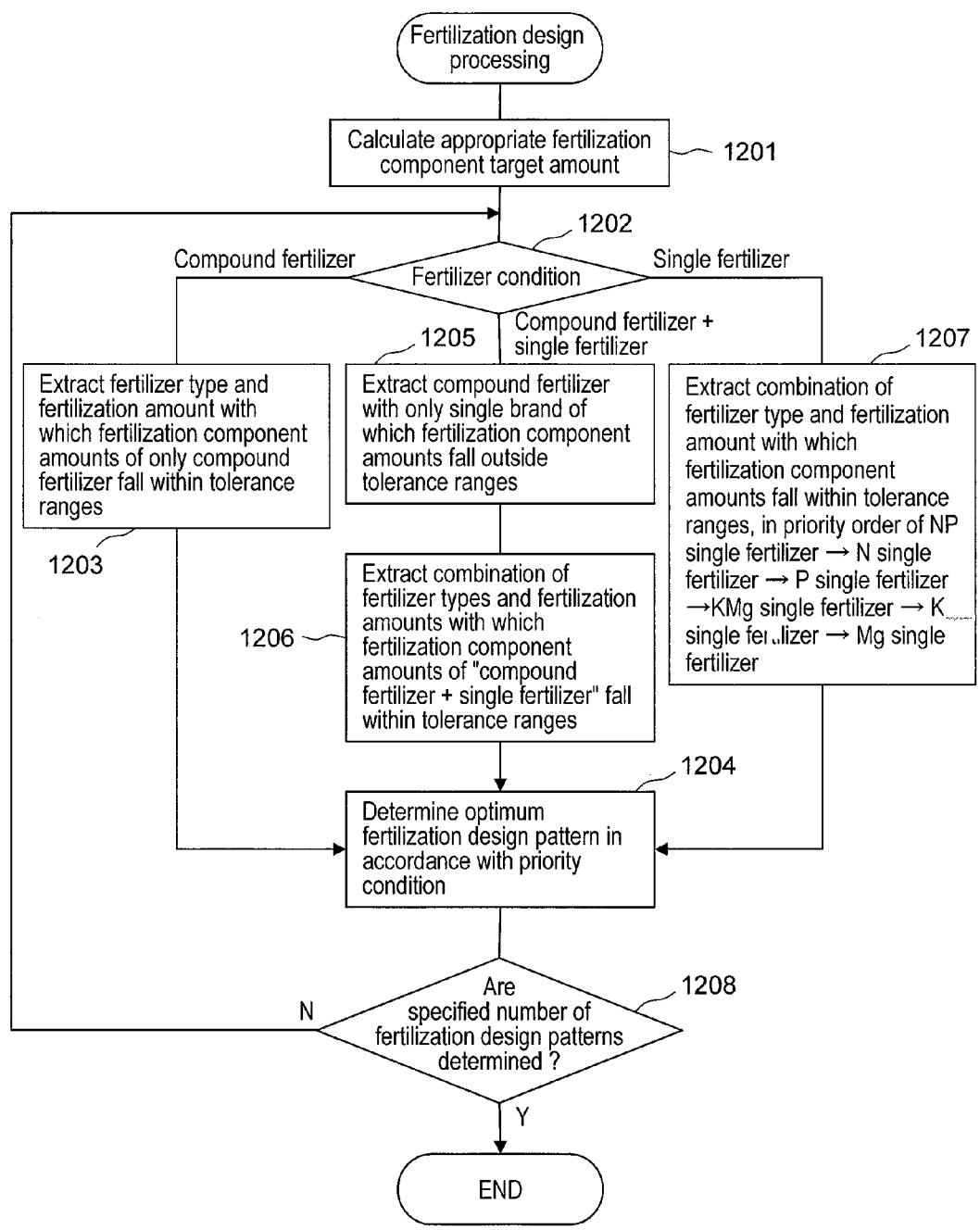
FIG. 12 is a flowchart of fertilization design processing.

FIG. 12 is a flowchart of fertilization design processing.

In this processing, an appropriate fertilization component target amount of each component in a case where a planned crop is planted in a target agricultural field is calculated first with reference to the soil information DB 108 and the soil analysis reference value maser DB 112 shown in FIG. 1 (step 1201).

For example, in a case where an appropriate fertilization component target amount of nitrogen for the target agricultural field is to be calculated, the crop number 204 to be planted in the target agricultural field is found from the soil analysis reference value master DB 113, and the soil code 304 for the target agricultural field and the nitrogen component amount 305 per 100 grams of the soil are found with reference to the soil information DB 108. In addition, a record for the soil component 703 of nitrogen corresponding to the crop number 204 and the soil code 304 is extracted from the soil analysis reference value master DB 112. Then, whether or not the nitrogen component amount 305 is within a reference range between the reference value lower limit 704 and the reference value upper limit 705 per 100 grams of soil is determined. Then, among the target amount 706 used when the component amount is not greater than the reference value, the target amount 707 used when the component amount is appropriate, and the target amount 708 used when the component amount is not less than the reference value, the applicable target amount is determined as the appropriate fertilization component target amount per planting area 10 *a*.

Next, the processing is branched in accordance with the fertilizer condition of "compound fertilizer," "compound fertilizer+single fertilizer," or "single fertilizer" (step 1202).

In a case where the fertilizer condition is "compound fertilizer," a fertilizer type and a fertilization amount with which the fertilization component amounts fall within tolerance ranges of the appropriate fertilization component target amounts with only a compound fertilizer are extracted with reference to the fertilizer master DB 111 shown in FIG. 1 (step 1203). Specifically, the tolerance ranges of the appropriate fertilization component target amounts for nitrogen, phosphoric acid, potash, and magnesium are calculated first. For example, in a case where an appropriate fertilization component target amount is 10 kilograms and a previously set tolerance range is ±20%, the tolerance range becomes 8 to 12 kilograms. Next, for each compound fertilizer in the fertilizer master DB 111, the fertilization amount is increased by five kilograms each to extract a fertilizer type and a fertilization amount with which the fertilization component amounts of all of nitrogen, phosphorous acid, potash, and magnesium fall within the tolerance ranges of the appropriate fertilization component target amounts. Whether or not a fertilizer of the fertilizer maser DB 111 is a compound fertilizer is determined with reference to the fertilizer classification 603. In addition, the calculation method of the fertilization component amount of nitrogen is "nitrogen content 604/100×fertilization amount."

Among the compound fertilizers extracted in step 1203, an optimum fertilization design pattern is determined in accordance with the priority condition of "priority on tolerance," "priority on fertilizer costs" or "priority on application amount" (step 1204). For "priority on tolerance," each tolerance rate of nitrogen, phosphoric acid, potash, and magnesium is calculated, and a compound fertilizer with which the total value of the tolerance rates becomes the smallest is extracted. At this time, if there are multiple fertilizers with which the total value of the tolerance rates becomes the smallest, the optimum fertilizer is determined on the basis of the priority order 608 of the fertilizer master DB 111. In addition, the method of calculating the tolerance rate of each fertilization component is "(fertilization component amount–appropriate fertilization component target amount)/appropriate fertilization component target amount."

For "priority on fertilizer costs," a compound fertilizer with which the fertilizer costs become the lowest is extracted. At this time, if there are multiple compound fertilizers with which the fertilizer costs become the lowest, the optimum fertilizer is determined on the basis of the priority order 608 of the fertilizer master DB 111. In addition, the method of calculating the fertilizer costs is "fertilization amount/20×fertilizer unit price 609."

For "priority on application amount," a compound fertilizer with which the fertilization amount becomes the smallest is extracted. At this time, if there are multiple compound fertilizers with which the fertilization amount becomes the smallest, the optimum fertilizer is determined on the basis of the priority order 608 of the fertilizer master DB 111.

In a case where the fertilizer condition is "compound fertilizer+single fertilizer," a compound fertilizer, with a single brand of which the fertilization component amounts fall outside the tolerance range, is extracted (step 1205).

Specifically, the tolerance ranges of the appropriate fertilization component target amounts of nitrogen, phosphoric acid, potash, and magnesium are calculated first. Next, for each compound fertilizer in the fertilizer master DB 111, the fertilization amount is increased by five kilograms each to extract a fertilizer type with which the fertilization component amounts of all of nitrogen, phosphorous acid, potash, and magnesium do not fall within the tolerance ranges of the appropriate fertilization component target amounts.

For the compound fertilizer extracted in step 1205, a combination of fertilizer types and fertilization amounts with which the fertilization component amounts in the extracted compound fertilizer and a single fertilizer fall within the tolerance range is extracted (step 1206). Specifically, for the compound fertilizer extracted in step 1205, firstly, the fertilization amount is increased by five kilograms each to calculate a fertilization amount with which the fertilization component amounts of nitrogen, phosphoric acid, potash, and magnesium do not exceed the tolerance range upper limits of the appropriate fertilization component target amounts.

Next, in order to compensate a fertilization component lower than the tolerance range lower limit, the fertilization amount is increased by one kilogram each for each single fertilizer in the fertilizer master DB 111, to extract a combination of fertilizer types and fertilization amounts with which the fertilization component amounts of all of nitrogen, phosphoric acid, potash, and magnesium in "compound fertilizer+ single fertilizer" fall within the tolerance ranges of the appropriate fertilization component target amounts.

Among the combinations of "compound fertilizer+single fertilizer" extracted in step 1206, an optimum fertilization design pattern is determined in accordance with the priority condition of "priority on tolerance," "priority on fertilizer costs," or "priority on application amount" (step 1204).

When the fertilizer condition is "single fertilizer," a combination of the fertilizer type and the fertilization amount with which the fertilization component amounts fall within the tolerance ranges is extracted in the priority order of NP single fertilizer→N single fertilizer→P single fertilizer→KMg single fertilizer→K single fertilizer→Mg single fertilizer (step 1207). Specifically, the tolerance ranges of the appropriate fertilization component target amounts of nitrogen, phosphoric acid, potash, and magnesium are calculated first.

Next, the fertilization amount is increased by one kilogram each for each NP single fertilizer in the fertilizer master DB, to extract a fertilizer type and a fertilization amount with which the fertilization component amounts of nitrogen, phosphoric acid, potash and magnesium do not exceed the tolerance range upper limits of the appropriate fertilization component target amounts. Further, in order to compensate a fertilization component lower than the tolerance range lower limit, the fertilization amount is increased by one kilogram each for each single fertilizer in the fertilizer master DB in the priority order of N single fertilizer→P single fertilizer→KMg single fertilizer→K single fertilizer→Mg single fertilizer to extract a combination of a fertilizer type and a fertilizer amount with which the fertilization component amounts of all of nitrogen, phosphoric acid, potash, and magnesium fall within the tolerance ranges of the appropriate fertilization component target amounts.

Among the combinations of single fertilizers extracted in step 1207, an optimum fertilization design pattern is determined in accordance with the priority condition of "priority on tolerance," "priority on fertilizer costs," or "priority on application amount" (step 1204).

Finally, whether the design processing for a specified number of fertilization design patterns is completed or not is determined. If not completed, the processing returns to step 1202, and design of the next fertilization design pattern is performed. If completed, the fertilization design processing is ended (step 1208).

Here, the specified number may be an internal number optionally settable by the system or may be the number of combinations of specified fertilizer conditions and priority conditions.

FIG. 15 is a display image of fertilization design result. With the map-linked fertilization design system, three types of a fertilization design pattern suitable for the soil and crop can be automatically shown in linkage with map data and in accordance with fertilization design conditions each including a fertilizer pattern of "compound fertilizer only," "compound fertilizer+single fertilizer," or "single fertilizer only," and a priority condition of "priority on tolerance," "priority on fertilizer costs," or "priority on application amount" within a tolerance range of an appropriate fertilization component target amount for each component. In addition, an appropriate fertilizer type and an appropriate fertilization amount can be determined in comparison with the three types of the fertilization design pattern on the same screen.

While we have shown and described several embodiments in accordance with our invention, it should be understood that disclosed embodiments are susceptible of changes and modifications without departing from the scope of the invention. Therefore, we do not intend to be bound by the details shown and described herein but intend to cover all such changes and modifications within the ambit of the appended claims.

What is claimed is:

1. A map-linked fertilization design system for designing a fertilization pattern for an agricultural field by use of a computer, the system comprising:
   a map data display configured to display a map including an agricultural field;
   a fertilization condition receiver configured to receive a fertilization design condition from an input screen after receiving designation of an agricultural field on the displayed map, the fertilization design condition including a priority condition and a combination pattern of fertilizers used for fertilization;
   a fertilization design unit configured to design at least one fertilization pattern for the agricultural field with reference to a database storing therein soil information on the agricultural field and a database storing therein information on fertilizers, and also with reference to the fertilization design condition received by the fertilization condition receiver; and
   a fertilization design result display configured to display the at least one fertilization pattern and information on the agricultural field on the same screen, the fertilization pattern designed by the fertilization design unit.

* * * * *